United States Patent [19]

Kiczek

[11] Patent Number: 4,763,568
[45] Date of Patent: Aug. 16, 1988

[54] POPCORN POPPER

[76] Inventor: Casimir R. Kiczek, 27109 Kingswood Dr., Dearborn, Mich. 48127

[21] Appl. No.: 782,035

[22] Filed: Sep. 30, 1985

[51] Int. Cl.$^4$ .............................................. A23L 1/18
[52] U.S. Cl. .................................. 99/323.5; 99/323.7; 99/325; 219/400
[58] Field of Search ................. 99/323.5, 323.7, 323.9, 99/323.11, 325, 331, 332, 333; 219/400, 432, 433, 436, 441, 442

[56] References Cited

U.S. PATENT DOCUMENTS

| | | | |
|---|---|---|---|
| 2,570,126 | 10/1951 | Hobbs | 99/323.5 |
| 3,059,567 | 10/1962 | Lindemann | 99/323.11 |
| 3,323,440 | 6/1967 | Grant | 99/323.5 |
| 3,611,910 | 10/1971 | Hughes | 99/323.5 |
| 3,725,642 | 4/1973 | Weidner | 219/433 |
| 3,756,139 | 9/1973 | Wolens | 99/323.5 |
| 4,072,091 | 2/1978 | Richardson | 99/323.5 |
| 4,178,843 | 12/1979 | Crabtree et al. | 99/323.8 |
| 4,445,427 | 5/1984 | Kiczek | 99/323.5 |

Primary Examiner—E. A. Goldberg
Assistant Examiner—Lincoln Donovan
Attorney, Agent, or Firm—John R. Benefiel

[57] ABSTRACT

A popcorn popper utilizing an oil heating mechanism with a pair of heating elements for heating kernels of unpopped corn to form popcorn is disclosed. The popcorn popper includes a base member and a heating mechanism for heating the oil and the kernels of unpopped corn to form popcorn. The alternate embodiment, the heating mechanism includes an air heating mechanism.

3 Claims, 2 Drawing Sheets

U.S. Patent  Aug. 16, 1988  Sheet 1 of 2  4,763,568
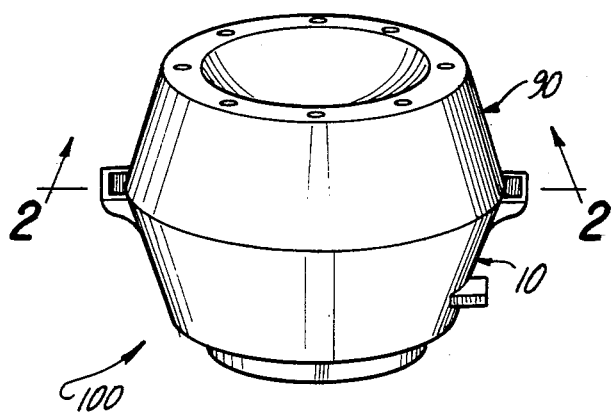
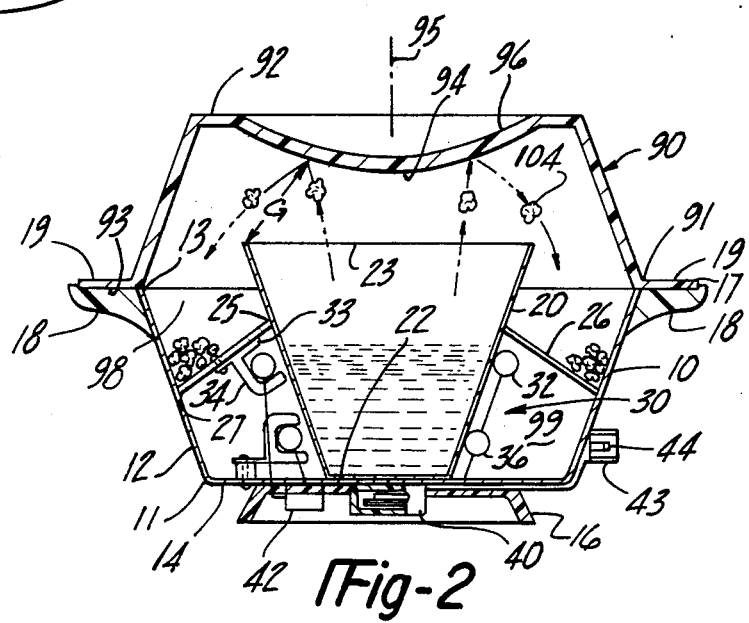
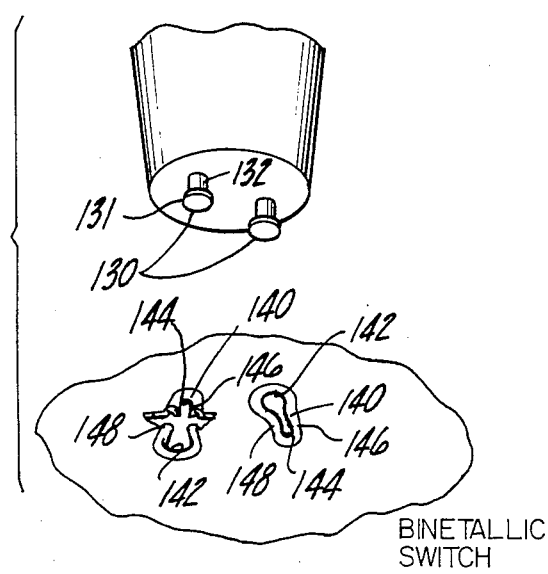
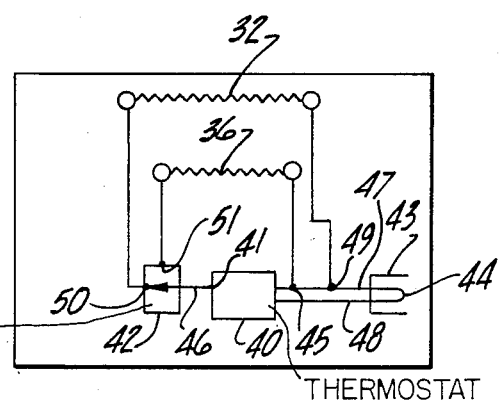

POPCORN POPPER

BACKGROUND OF THE INVENTION

This invention relates to an apparatus of popping corn using two heating coils to heat the popping vessel so as to cook the kernels of corn to form popcorn. More particularly, this invention relates to a device for popping kernels of corn using heated air and using the same heated air to carry the popcorn from the popping chamber in one embodiment. In the other embodiment, the invention relates to a device using heated oil to pop the kernels of corn to form popcorn.

Today, there are two widely known methods for popping kernels of corn. The first is by the use of oil to coat the kernels of corn prior to heating the kernels in a heat transfering pan or kettle. The other known method of popping corn uses hot air passing over the kernels of corn, suspending the kernels of corn in the hot air and carrying the popcorn from a chamber to a separate location.

In the method using oil to heat the kernels of corn, the coating of oil tends to distribute the heat evenly over the entire surface of the kernel. As the moisture within the kernel is heated, it causes the kernel of corn to expand and pop. The heat is usually supplied directly to the bottom surface of the pan or kettle in which the kernels of corn are placed. The pan then transfers the heat to the oil and then to the surface of the kernels of corn. The heat causes the kernels of corn to expand and form popcorn.

There are several known popcorn poppers utilizing oil to heat the kernels of corn. For example: Hobbs, U.S. Pat. No, 2,570,126; Hughes, U.S. Pat. No. 3,611,910 and Kiczek, U.S. Pat. No. 4,445,427.

Several types of popcorn poppers using heated air have been proposed, and the following are examples: Wolens, U.S. Pat. No. 3,756,139; Crabtree et al, U.S. Pat. No. 4,178,843; Richardson, U.S. Pat. No. 4,072,091; Lidenman, U.S. Pat. No. 3,059,567; Grant, and U.S. Pat. No. 3,323,440. In this type of popper, no oil is applied to pop the kernels of corn but instead dry raw kernels of corn are used. The kernels are suspended in a stream of hot air or other inert gas until the heat causes the kernels to expand and form popcorn. Then the same stream of heated air transports the popcorn to a separate location.

The oil method has advantages and disadvantages over the air popping method. Neither method has been found superior in the eyes of the consumer. It is for this reason that most known popcorn popping devices utilize either the oil method or utilize the air heating method.

None of the aforesaid prior art devices provide an apparatus which permits a manufacturer to make a device which uses two heating coils to heat the oil to pop the kernels of corn to form popcorn in one embodiment. In the other embodiment using two heating coils to heat air to pop the kernels of corn to form popcorn.

SUMMARY OF THE INVENTION

In the commercial world, where maximum manufacturing flexability is desirable, there exists a need to provide a popcorn popping device which permits a manufacturer to easily switch the configuration of a popcorn popper from the oil heated method to the air heated method.

In accordance with the present invention, a popcorn popper device utilizing two heating coil to heat the air to pop the kernels of unpopped corn therein to form popcorn is provided. In the other embodiment, the two heating coils are used to raise the temperature of the oil for heating kernels of unpopped corn to form popcorn.

BRIEF DESCRIPTION OF THE DRAWINGS

FIG. 1, is a perspective view of the popcorn popper according to my invention;

FIG. 2, is a side sectional view taken along line 2—2 of FIG. 1, of the invention incorporating the oil heating method embodiment of the invention;

FIG. 3, is a partial perspective view of an alternate embodiment of the invention using the oil heating method.

FIG. 4, is a schematic of an electrical circuit used in the embodiment shown in FIG. 2;

DETAILED DESCRIPTION

Figure 5:
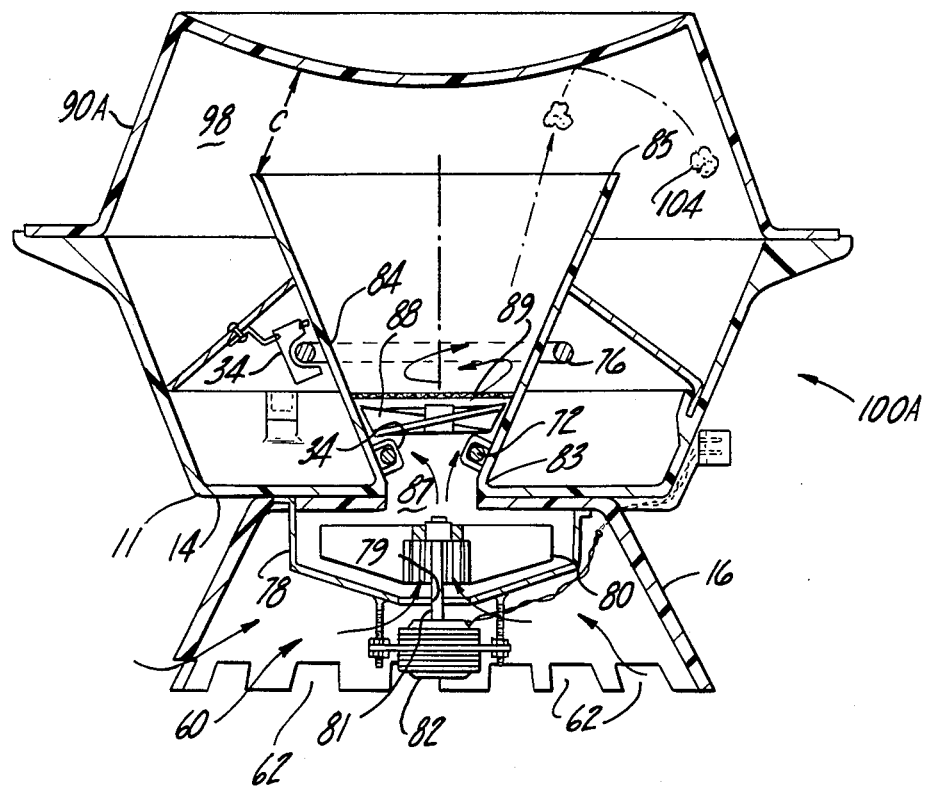
FIG. 5, is a side sectional view along line 2—2 of FIG. 1 of the invention incorporating the air heating method embodiment of the invention.

FIG. 1 shows the preferred embodiment of the popcorn popper according to the present invention which popper 100 includes a base member 10 and a bowl member 90.

As shown in FIG. 2, the bowl member 90 is preferably made of a transparent plastic and heat resistant material which is capable of withstanding sudden and severe temperature changes.

The bowl member has a rim portion 91 with a pair of diametrically disposed molded handles 19 extending from the rim portion 91. Each of the molded hangles 19 has a flat planer portion 93 for a purpose to be described later on herein.

The bowl member 90 includes a deflector member 96. The deflector member 96 is fastened to the top 92 of the bowl member 90 by conventional fastening means such as screws or preferably molded to the bowl member top 92. The peak 94 of the deflector member 96 projects toward the rim portion 91 when the bowl member is mounted on the base member 10 as shown in FIG. 2.

The deflector member 96 may be of any geometric shape such as hemispherical or hemi-eliptical or a right circular cone. The deflector member 96 is preferably a hemi-eliptical surface which projects away from the top 92 of the bowl member.

In addition, the deflector member 96 has an axis 95 as is typical of surfaces generated by a surface of revolution about an axis. The purpose of the deflector member 96 will be described later on.

The base member 10 includes a housing member 12, a support member 14, a base support member or stand 16, a conical pan member 26 and handles 18. The housing member 12 is generally in the shape of a shell which is preferably a truncated cone.

The support member 14 is generally in the shape of a rounded plate which is suitably fastened such as by welding or brazing or conventional fastening means at its outer periphery to the one end 11 of the housing member 12.

The base support member 16 is preferably in the shape of an inverted truncated cone which is suitably fastened to the support member 14. The base support member 16 is preferably made from the heat insulating material for a purpose to be described later on.

The other end 13 of the housing member 12 forms a generally circular rim. Handles 18, which are preferably two in number, are diametrically disposed adjacent to the rim of the housing member 12. The handles 18 are fastened to the housing member 12 such as by conventional fastener means including screw threaded members (not shown).

Each handle 18 has a flat planer portion which is disposed in a generally horizontal manner when the base member 10 is placed on a generally horizontal surface. The flat planer portion 17 of the handles 18 of the housing member 12, cooperatively engage the flat planer portion 93 of the handles 19 to bowl member 90.

Thus, the bowl member is supported onto the base member as shown in FIGS. 1 and 2. Returning back to FIG. 2, the conical pan member 26 is mounted to the housing member 12 such that the outer rim 27 of the conical pan member 26 is contiguous to the housing member 12 between one end 11 and other end 13.

The popcorn popper 100 according to the present invention includes an oil heating means 30 for cooking kernels of corn with oil to form popcorn by the oil heated method. The alternative embodiment employing an air heating means 60 for heating kernels of corn to form popcorn. (The oil heating means 30 is shown in FIG. 2 and the air heating means 60 is shown in FIG. 5.)

Returning back to FIG. 2, the oil heating means 30 includes a first heating element 32 and a second heating element 36, a popping vessel 20, a thermostatic switch 40, a bimetallic switch 42, a socket holder 43 and electrical wires.

The bottom 22 of the popping vessel is mounted to the support member 14 as by conventional rivets, screw fasteners, welding, soldering or similar fastening means. The popping vessel 20 is oriented on the base member 10 with this longitudinal axis in the vertical direction so that when the base member is in normal use, the longitudinal axis of the popping vessel 20 is substantially vertical.

The popping vessel 20 may be made by conventional material such as steel or aluminum. The popping vessel 20, preferably expands from its bottom end 22 towards its top end 23. The bottom end 22 is closed whereas the top end 23 is open. It is important that the popping vessel 20 is capable of holding a liquid without leaking.

The preferred shape of the popping vessel is a truncated cone which expands diametrically from its bottom end. However, those skilled in the art will recognize that other similar shaped vessels may be used in practicing my invention including a hemispherical, cylindrical or polygonal shaped vessels. The deflector 96 is separated from the top 23 of the popping vessel 20 by gap G. Gap G is at least the diameter of a popcorn 104.

The conical pan member 26 is fastened at its outer rim 27 to the housing member 12 and at its inner rim 25 to the popping vessel 20 to form a cavity 99 in the housing member 12.

The first and second heating means 32,36 respectively are disposed inside the cavity member 99 and adjacent the popping vessel 20.

In the preferred embodiment, the first element 32 and second heater element 36 are positioned between the support member 14 and the conical pan member 26 such that the first heater element 32 is mounted circumferentially about the popping vessel 20 just below the surface that the oil and kernels of unpopped corn sought to be cooked would occupy in the popping vessel 20.

The second heater element 36 is mounted circumferentially about the popping vessel 20 and preferably positioned above the support member 14 but below the first element heater 32. The second heater element 36 may alternatively be mounted adjacent or contiguous to the bottom 22 of the popping vessel 20.

The first and second heater elements 32,36 respectively are of a conventional construction and are preferably made from a high resistance electrical wire such as sold under the Trademark nichrome.

The first heater element 32 is supported by a plurality of C shaped insulators 34 around the popping vessel 20 which are held in position by slots in a circular spacer plate. Fingers extending from the spacer plate hold the base 33 of the C shaped insulators 34 in place by pushing the shoulder of the larger base against the slot in the spacer plate.

The spacer plate holding the first heating element 32 is fastened by conventional fastener means to the conical pan member 26 whereas a spacer plate holding the second heater member 36 is fastened by conventional fastening means to the support member 14. Thus the heating elements are electrically insulated from touching the popping vessel 20 and other metal parts. This method of supporting the insulators and heater elements is conventional and well known in the art.

Referring to FIGS. 1, 2 and 4, the electrical socket holder 43 is suitably mounted to the housing member 12 near its one end 11. The electrical holder 43 is conventional as well as the two inlet prongs 44 therein so as to receive a conventional socket plug of a conventional electrical line cord.

The electrical socket holder 43 is connected to one side of a thermostatic switch 40 by wires 48 and 47. The thermostatic switch 40 is mounted to the support member 14 to be below the bottom of the popping vessel 20 so as to measure the temperature of the bototm of the popping vessel 20 through the opening 87 in the support member 14.

A wire 46 connects the other side 41 of the thermostatic switch 40 to a bimetallic switch 42 which is mounted by conventional fastener means to the base support member 16 and thermally insulates the bimetallic switch from the heat generated by the heating elements 32 and 36. The thermostatic switch 40 is conventional in construction, and is a normally closed switch which opens or breaks the electrical circuit only upon exceeding a pre-set temperature.

The bimetallic switch 42 is designed to provide electrical current to the first heating element 32 for a pre-set time through a first contact 50. After the pre-set time, the bimetallic switch discontinues the current through the first heating element 32 and provides electrical current to the second heating element 36 through a second contact 51. Bimetallic switches are well known in the art and for example are shown in U.S. Pat. No. 3,432,217.

The bimetallic switch 42 has a blade member that is caused to move from contact 50 to contact 51. The movement is caused by the electrical resistance of the two different metal characteristics and their respective coefficient of expansion to temperature. As the current flows thru the blade member, the blade member heats up and bends from its normal position at contact 50 to a second position at contact 51.

The second heating element 36 is connected to the second contact 51 of the bimetallic switch and to the wire 47 at function 45 near the thermostatic switch 40. The first heating element 32 is electrically connected to the first contact 50 in the bimetallic switch on one side and to wire 47 at junction 49 to complete the electrical circuit as shown in FIG. 4. Those skilled in the arts will recognize that a two stage electrical heating system has been described.

The operation of the popcorn popper 100 with oil heating means 30 according to my invention begins by placing a predetermined amount of kernels of corn and oil in the popping vessel 20 and connecting the pair of inlet prongs 44 to a source of A-C circuit.

Thus, first heater element 32 becomes operational when the electrical socket holder 43 is connected to a source of household electricity. After a predetermined period of time, the bimetallic switch 42 disconnects the electrical current from flowing to the first heater element 32 and permits the current flow through the second heating element 36.

The second heating element 36 continues to operate until the thermostatic switch 40 opens to discontinue electrical current through both heater elements 32,36. As this occurs, the kernels of corn and oil in the popping vessel 20 are first heated near the top surface of the oil and kernels of corn in the popping vessel.

The heating process continues such that the kernels of corn begin to pop to form popcorn 104. Thence, the popcorn 104 leaps up from the popping vessel 20 and hits the deflector 96. The popcorn 104 upon striking deflector 96 are caused to change direction and fall into the inner volume 98 formed between the bowl 90 and the conical pan member 26 of the base member 10 as shown in FIG. 2.

After a predetermined period of time, the cooking process proceeds and the top surface 21 (formed by the oil and kernels of corn in the popping vessel 20) moves towards the bottom 22 of the popping vessel 20.

The bimetallic blade in the bimetallic switch 40 is initially in contact with the first contact 50, which causes the electrical current to flow only through the first heating element 32. As the bimetallic element heats up due to it's resistance to the electrical current flowing through the blade, the bimetallic blade moves to the second contact 51 in the bimetallic switch 42 to permit the electrical current to flow through only the second heating element 36 and heat the lower portion of the popping vessel 20.

The second heating element 36 continues to cook the oil and kernels of corn in the popping vessel 20 until the thermostatic switch 40 senses a predetermined temperature and stops the flow of current through the first and second heating elements 32,36 and the cooking process stops.

In the preferred embodiment of my popcorn popper utilizing the oil heating means 30, the bimetallic switch 42 provides current to the first heating element 32 for approximately five minutes and the second heating element 36 for an indefinite amount of time normally less than five minutes.

The popping vessel 20 is preferably five inches high and three inches in diameter at its bottom end and four inches in diameter at its top end. This size popping vessel permits the use to pop ⅔ cup of kernels of unpoped corn and approximately 1/3 cup of oil to form approximately 4 quarts of popcorn 104.

In FIG. 5, an alternative embodiment of the popcorn popper 100 utilizing air heating means 60 is shown. In the air heating configuration, of my popcorn popper 100, air heating means 60 includes a first heating element 72 and a second heating element 76, a fan 80 driven by an electric motor 82, a fan shroud 78, a popping chamber 84, an axial swirler 88, a screen 89, an opening 87 in the support member 14, and wires 66, and 68. All other elements of this popcorn popper are numbered the same as previously described in the configuration describing my popcorn popper utilizing oil heating means.

The electric motor 82 is conventionally mounted in the base of support member 16. The fan 80 is directly connected to the motor 12 by shaft 81.

The electric motor and fan are conventionally mounted below the popping chamber 84 in the base support member 16. The base support member 16 has a plurality of openings 62. A fan housing 78 is provided between the fan 80 and the motor 82 such that the shaft 81 connects the fan 80 with the motor 82 by passing through a centrally located opening 79 in the fan housing 78.

The fan housing 78 may be radially tapered or conically shaped to maintain a close clearance with the tip of the fan blades. Additionally, the motor 82 is mounted to the fan shroud 78 by conventional fastening means near the central opening 79. The fan housing 78 is connected to the support member 14 by conventional means such as fasteners, or welding, etc.

The motor 82 is a universal AC motor which receives its electrical power from a conventional AC wall plug through a conventional electric cord. The electrical hook up of the motor 82 and the first and second heating elements 72,76 respectively will be described later on herein.

As previously described, the support member 14 is generally a flat circuit element connected at its outer periphery to the one end 11 of the housing member 12. Furthermore, in the air heating embodiment, the support member 14 has a central opening 87 formed in it to receive the popping chamber 84.

The popping chamber 84 is generally in the shape of a truncated cone whith expands diametrically from its bottom end 83 to its top end 85. The popping chamber 84 is oriented to the base member 10 with its longitudinal axis in the vertical direction. When the base member is in normal use, the longitudinal axis of the popping chamber 84 is substantially vertical. The popping chamber 84 may be made of conventional materials such as steel or aluminum.

Between the top end 85 and the bottom end 83, a first heating coil 76 is placed around the outer periphery of the popping chamber 84. The first heating coil is electrically insulated from the parts by means of C shaped insulators 34 previously described in the oil heating means embodiment.

As shown in FIG. 5, near the bottom end 83 of the popping chamber 84, an axial swirler 88 is mounted in the popping vessel 84. Below the axial swirler, a second heating coil 72 is mounted within the popping chamber 84 near its bottom end 83.

The second heating coil 72 is of a conventional design and is connected electrically by wires 66,68 to an on/off switch 74 and the conventional alternating current source.

The second heating coil 72 is electrically insulated from touching the popping chamber and other metal parts by means of ceramic C shaped insulators 34 previously described in the oil heating means embodiment.

When assembled, the second heating coil 72 is both supported by the C shaped insulators 34 and electrically insulated from touching the popping chamber and other metal parts. The first and second heating coils 72,76 respectively are preferably made from wire sold under the Tradename nicrome wire as is well known in the conventional art.

The axial swirler 88 is generally flat and round member with a plurality of vanes formed therein. It is important that the angle of the vanes relative to the longitudinal axis passing through the popping vessel be greater than zero but less than ninety degrees.

The reason for this is simply that for the air to circulate and mix with the kernels of corn placed in the popping vessel, the angle of the vanes relative to the longitudinal axis must be adjusted to the size of the popping vessel 84 used. In the preferred embodiment, the angle of the vanes are 37½ degrees from its horizontal axis to obtain optimum results.

To prevent kernels of corn from falling through the bottom of the popping vessel 84, a screen 89 having openings smaller than 0.09 inches in diameter is mounted in the popping chamber 84 above the axial swirler 88 and the second heating coil 72 as shown in FIG. 5.

Preferably, the interior diameter at the top end 85 of the popping chamber 84 is larger than the interior diameter at the bottom end 83 of the popping chamber.

Additionally, there should be a gradual increase in diameter of the popping chamber from the bottom to the top. This gradual increase in diameter in the popping chamber helps to reduce the velocity of the heated air passing through the popping chamber 84 near the top end 85 of the popping vessel.

As a result, any unpopped kernels of corn lifted up by the air will have a tendency to fall towards the bottom of the popping chamber before reaching the top end 85 of the popping chamber. On the other hand, the popped kernels of corn which have formed popcorn 104, will have a tendency to rise out of the popping chamber 84.

To further help facilitate discharging the popped kernels of corn (that is the popcorn 104) from the popping chamber 84, the deflector 96 is separated from the top of the popping chamber by gap C.

Gap C is at least the diameter of a popped corn 104. Gap C acts as a restrictor which increases the velocity of the air near the top 85 of the popping chamber 84 to improve the discharge of popcorn out of the popping chamber 84 and into the inner volume 98 formed by the bowl member and the housing member 12.

Figure 6:
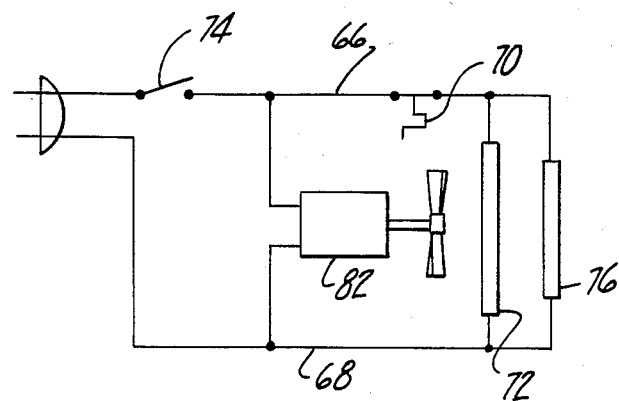
FIG. 6, is a schematic of the electrical circuit of the invention utilizing the air heating embodiment of the invention shown in FIG. 5.

FIG. 6, is a schematic of the electrical circuit utilized in my popcorn 100 with the air heating means 60. The popcorn popper 100 can be powered electrically by connecting the plug into a conventional household outlet supplying 120 volt alternating current.

The on/off switch 74 and an outlet holder are located on the base support member 16. The on/off switch 74 which powers the fan 80 to blow air into the popping vessel, may be optionally connected to a conventional thermostatically controlled element switch 70. The switch 70 acts to cut off the electrical power to the first and second heating coil 72,76 respectively while permitting the motor 82 to continue to operate fan 80 to throw cooling air through the popcorn popper 100 in the event of an unusually high temperature build up within the popper 100.

The electrical cord holder is connected by wires 66,68 to the motor. Additionally, the first and second heaters 72,76 respectively are connected to wires 66,68 as shown in FIG. 6.

The operation of my popcorn popper 100 utilizing the alternative embodiment of the air heating means 60 begins by placing a predetermined amount of unpopped kernels of corn into the popping chamber 84 and turning "on" the on/off swtich 74.

As this occurs, the motor 82 begins to rotate the fan 80. Air then enters the popcorn popper 100 through air passages 62 in the base support member 16, through the opening 79 in the fan shroud 78 through the opening 87 and into the popping chamber 84.

The air entering the popping chamber first passes over the second heating coil 72 where the air is heated, then through the screen 89, and then through the axial swirler 88. As the heated air passes through the axial swirler 88, air is further heated up by virtue of the fact that the heat radiated by both the first and second heating coils 72,76 respectively is absorbed by the popping chamber 84 and is conducted through the axial swirler 88.

Additionally, as the air passes through the axial swirler 88, the air is caused to circulate within the popping chamber 84. The swirling motion in the popping chamber 84 results in the mixing, lifting and suspension of the unpopped kernels of corn until the kernels of corn "pop" to form popcorn 104.

The vanes in the swirler 88 are arranged to swirl the air within the popping chamber 84 in a controlled circular direction (clockwise, or counter clockwise) to achieve optimum mixing of the air and the unpopped kernels of corn.

The heated swirling air, which agitates and circulates the unpopped kernals of corn near the bottom end 83 of the popping chamber, creates a fluidized bed of corn circulating within the popping chamber 84.

Because this action of the heated air results in a loss of temperature of the air as the air swirls through the kernels of unpopped corn, the first heating coil 76 is provided to radiate heat to the walls of the popping chamber 84. Thus as the air passes through the kernels of unpopped corn, within the popping chamber 84, the air is further heated as the air further rises and moves adjacent to the walls of the popping chamber 84.

As the heated air circulates, the unpopped kernels of corn within the popping chamber 84 reach the popping temperature and expand to form popcorn 104, and being larger and fluffier than the unpopped kernels of corn, the popcorn 104 is lifted or caused to float in the popping chamber 84.

As more and more kernels of corn pop to form popcorn 104, popcorn 104 rises upward towards the top end 85 of the popping chamber 84. As this occurs some of the kernels of unpopped corn are invariably mixed in with the rising popcorn 104 in the popping chamber 84.

To reduce the incidence of discharging kernels of unpopped corn 110 out of the popping chamber 84, the velocity of the swirling heated air is reduced by the expansion of the popping chamber 84 from the bottom end 83 towards the top end 85.

This reduces the ability of the unpopped corn kernels to float near the top end 85 of the popping chamber 84, and as a result, the kernels of unpopped corn drop down toward the bottom end 83 of the popping chamber.

The popcorn 104 however, continues to float or rise to the top end of the popping chamber where the popcorn 104 is caused to eject out of the popping chamber 84 then strike the deflector member 96 then pass through gap C and fall to the inner volume 98.

The unpopped kernels of corn in the popping chamber 84 will continue to mix and swirl with the heated air until most, if not all, are popped and form popcorn 104. At this stage of the cycle, the popper 100 may be shut down by the on/off switch 74 to the "off" position.

The invention has been described with reference to a preferred and alternate embodiments. Various modifications can be made to describe the invention without departing from the scope of the invention. For example, FIG. 3 shows an alternate embodiment of the popcorn vessel 20 utilized in the oil heating means 30 embodiment of the current invention in that the popping vessel has a pair of rivets 130 welded or molded to the bottom of the popping vessel, such that the popping vessel does not leak.

The rivets have a stem 131 and a head 132. The bottom of the housing member 12 has a pair of slots 140. The slots have a circular portion 142 to permit insertion of the head of the rivets of the popping vessel.

The slots also have a arcuate portion 144 with two opposite caming sections 146,148. When the head 131 of the rivets 130 are inserted into the circular portion 142, the popping vessel is then rotated to advance the rivet stem 131 into the arcuate portion 144. In doing this, the caming sections cause the bottom of the popping vessel and the rivet head to frictionally engage the arcuate portions and lock the popping vessel 20 in the housing member 12.

I claim:

1. A popcorn popper utilizing oil and kernels of unpopped corn to form popcorn, said popcorn popper comprising:
   a popping vessel having a top end, a bottom end opposite said top end and portions defining a passageway between said top end and said bottom end, said top end being larger than said bottom end, said top end of said passageway further being open, said bottom end of said passageway being closed;
   a pair of heating elements mounted adjacent to said popping vessel, one of said pair of heating elements adjacent to said bottom end of said popping vessel, the other of said pair of heating elements adjacent to said passageway in said popping vessel;
   means, connected to said pair of heating elements, for sequentially operating the first of said pair of heating elements for a predetermined period of time before the second of said pair of heating elements so as to heat the oil and the kernels of unpopped corn to the popping temperature; and
   a deflector member mounted a predetermined distance above said top of said popping vessel.

2. A popcorn popper as claimed in claim 1 further comprising:
   means for removably mounting said popping vessel to said base member.

3. A device for popping kernels of unpopped corn to form popcorn, said device comprising:
   a receptacle having a bottom end, a top end and a portion forming a passageway between said top end and said bottom end for holding kernels of unpopped corn;
   means, mounted adjacent to said receptacle, for heating the kernels of unpopped corn to a temperature sufficient to permit the kernels of unpopped corn to form popcorn, said heating means including:
   an air pump;
   an axial swirler mounted in said passageway of said receptacle;
   a pair of heating elements mounted adjacent to said receptacle, one of said pair of heating elements mounted adjacent to said bottom end of said receptacle, the other of said pair of heating elements adjacent to said passageway between said top end and said bottom end of said receptacle; and
   a deflector member mounted a predetermined distance above said top end of said receptacle.

* * * * *

UNITED STATES PATENT AND TRADEMARK OFFICE
CERTIFICATE OF CORRECTION

PATENT NO. : 4,763,568
DATED : August 16, 1988
INVENTOR(S) : Casimir R. Kiczek

It is certified that error appears in the above-identified patent and that said Letters Patent is hereby corrected as shown below:

Column 2, line 2, "coil" should be --coils--.

Column 2, line 37, "hangles" should be --handles--.

Column 4, line 40, "bototm" should be --bottom--.

Column 5, line 66, "use" should be --user--.

Column 5, lines 66-67, "unpoped" should be --unpopped--.

Column 6, line 44, "whith" should be --which--.

Signed and Sealed this

Seventeenth Day of January, 1989

Attest:

DONALD J. QUIGG

*Attesting Officer*      *Commissioner of Patents and Trademarks*